United States Patent [19]
Boutaghou et al.

[11] Patent Number: 5,768,056
[45] Date of Patent: Jun. 16, 1998

[54] REDUCTION OF LIQUID AND SMEAR COLLECTION/PICKUP BY SLIDERS

[75] Inventors: Zine-Eddine Boutaghou, Vadnais Heights; John Lawrence Brand; Dallas W. Meyer, both of Burnsville; David G. Wobbe, Shakopee, all of Minn.

[73] Assignee: Seagate Technology, Inc., Scotts Valley, Calif.

[21] Appl. No.: 831,688

[22] Filed: Apr. 10, 1997

Related U.S. Application Data

[60] Provisional application No. 60/023,535 Aug. 7, 1996.

[51] Int. Cl.[6] .................................................. G11B 5/60
[52] U.S. Cl. .................................................. 360/103
[58] Field of Search .................................. 360/102, 103; 428/421, 422, 913

[56] References Cited

U.S. PATENT DOCUMENTS

| | | | |
|---|---|---|---|
| 4,583,145 | 4/1986 | Monnich et al. | 360/135 |
| 4,992,300 | 2/1991 | Ogawa et al. | 427/44 |
| 5,284,391 | 2/1994 | Diel et al. | 360/99.12 |
| 5,423,612 | 6/1995 | Zang et al. | 384/119 |
| 5,488,523 | 1/1996 | Seaver et al. | 360/99.12 |
| 5,516,212 | 5/1996 | Titcomb | 384/107 |

OTHER PUBLICATIONS

"Nyebar Type K". Product Brochure from Nye Lubricants, Inc. undated but prior to Jul. 29, 1996.
"3M Fluorad Fluorochemical Coating, FC-722". Product Brochure from Minnesota Mining and Manufacturing Co., undated but prior to Jul. 29, 1996.
"Evaluation of Barrier Fluids for Dual Seal Applications, Part I", L. A. Young and W. E. Key, Lubrication Engineering, vol. 48, pp. 713–717 (1992).
"Evaluation of Barrier Fluids for Dual Seal Applications, Part II", L. A. Young and W. E. Key, Lubrication Engineering, vol. 50, pp. 55–61 (1994).

Primary Examiner—Stuart S. Levy
Assistant Examiner—David L. Ometz
Attorney, Agent, or Firm—Kinney & Lange, P.A.

[57] ABSTRACT

A slider for a magnetic disc drive includes a recess at the trailing edge of the slider. A thin film inductive magnetic transducer protrudes from a lower surface of the recess, the transducer having patterned magnetic poles. A barrier layer formed of an oleophobic, hydrophobic polymer having a surface energy lower than the surface tension of lubricant on the disc is bonded to the lower surface of the recess. One suitable polymer for the barrier layer is a fluorochemical acrylate.

15 Claims, 5 Drawing Sheets

1

REDUCTION OF LIQUID AND SMEAR COLLECTION/PICKUP BY SLIDERS

CROSS REFERENCE TO RELATED APPLICATIONS

This application claims priority of Provisional application Ser. No. 60/023,535 filed Aug. 7, 1996 for "Reduction of Liquid and Smear Collection/Pickup on Sliders" by Zine-Eddine Boutaghou, John L. Brand, Dallas W. Meyer and David G. Wobbe.

BACKGROUND OF THE INVENTION

This invention relates to improvements in magnetic transducers, and particularly to barrier layers for recesses associated with patterned poles of a thin film inductive transducer mounted to a slider of a magnetic disc drive.

Sliders are employed in magnetic disc drives to aerodynamically fly a magnetic transducer over the surface of the recording disc. The slider has two or more rails forming air-bearing surfaces separated by a cavity region. The cavity region forms a pressure region to develop a desired pressure between the slider and the disc surface to achieve desired flying characteristics for the slider. The magnetic transducer is positioned at the trailing edge of the slider, and may be incorporated in one of the air-bearing surfaces or may be centrally positioned behind the cavity.

In the case of a thin film inductive transducer, data magnetically encoded on a disc moving past the transducer induces a current into the transducer coil; the current is amplified and processed by appropriate processors. However, edges of the pole pieces forming the inductive transducer sometimes cause undesirable undershoot in the induced signal. Undershoot can often be minimized by patterning the pole pieces to a design configuration. Patterned pole transducers on magnetic sliders are formed by creating a recess in an island, or in the rail, on the slider body and forming the transducer as a protrusion in the recess to a level no higher than the adjacent island body or rail. The poles are patterned by etching away portions of the slider body and poles to the configuration desirable to reduce undershoot. Such transducers are known in the industry as "patterned poles" or SPUR transducers (for "Slider Pole Undershoot Reduction").

One problem associated with air-bearing sliders is that liquid lubricant on the disc and liquid outgassed during flying can collect in the pressure cavity. The lubricant and outgassed liquid "wicks" to the media when the media is stopped and the slider has landed thereon. The wicking liquid increases stiction between the slider and the media, requiring additional power for take-off (start) of the slider. Additionally, the liquid collected in the pressure cavity can pick up debris (smear) in the form of media particles, adversely affecting the pressure characteristics of the cavity and the flying characteristics of the slider.

To improve the sliding characteristics of sliders and reduce thereby stiction, it has been common to apply a rigid barrier layer to the air bearing surfaces on the rails of the slider. One material used for the rigid barrier layer is a monomolecular film of silane surfactants that is bonded to the air bearing surfaces by chemisorption as described in U.S. Pat. No. 4,992,300 granted Feb. 12, 1991 to Ogawa et al. It has also been common to extend the barrier material into the pressure cavity for ease of manufacturing, as well as to achieve limited benefits of reduced air friction within the pressure cavity associated with the rigid, smooth surface formed by the barrier film. While this barrier film provides a good rigid surface which is both smooth and resistant to wear, it does not provide a particularly good resistance to wicking of liquids and lubricants from the disc. More particularly, chemisorption bonded films do not exhibit good oleophobic and hydrophobic characteristics.

SUMMARY OF THE INVENTION

The present invention is directed to the application of an oleophobic, hydrophobic barrier layer to the recess of a patterned pole transducer on a slider.

In one form of the present invention, a slider for a magnetic disc drive includes a recess at the trailing edge of the slider. A thin film inductive magnetic transducer protrudes from a lower surface of the recess. A barrier layer formed of an oleophobic, hydrophobic polymer having a surface energy that is lower than the surface tension of the lubricant of the disc is bonded to the lower surface of the recess. One suitable polymer for the barrier layer is a fluorochemical acrylate.

In another form of the invention a slider for a magnetic disc drive comprises a body. The slider operates with a lubricated disc of the disc drive, wherein the lubricant has a known surface tension. At least two rails integral with the body and protruding from a surface of the body form air bearing surfaces substantially parallel to the body surface. A pressure cavity is formed by the body surface between the rails. A recess is formed at a trailing edge of the body, the recess having a lower surface substantially parallel to the air bearing surfaces. A thin film inductive patterned pole magnetic transducer protrudes from the lower surface of the recess toward the air bearing surface. A barrier layer is bonded to the lower surface of the recess. The barrier layer is constructed of an oleophobic and hydrophobic polymer having a surface energy lower than the surface energy of the material forming the slider and lower than the surface tension of lubricant on the disc. One suitable polymer is a fluorochemical acrylate. In one embodiment, the slider includes an island protruding from the body between the rails at the trailing edge of the body, and the recess is formed in the island. In another embodiment, the recess is formed in at least one of the rails.

DETAILED DESCRIPTION OF THE PREFERRED EMBODIMENTS

Figure 1:
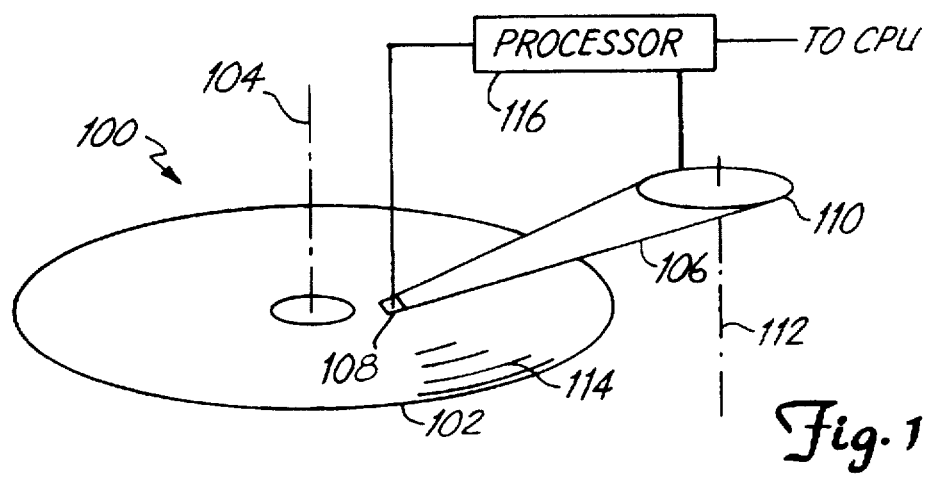
FIG. 1 is a perspective view of a disc drive apparatus.

FIG. 1 illustrates a disc drive 100 having one or more magnetic recording discs 102 arranged to rotate about disc axis 104. Actuator arm 106 includes, at a distal end, a slider 10 arranged to fly a transducing head adjacent the recording surface of disc 102. Actuator arm is operated by actuator motor 110 to rotate about actuator axis 112 to move the head(s) across concentric data tracks 114 on the respective surface of the respective disc 102. Each head is arranged to read data from and/or write data to the track of disc 102 confronting the head. Processor 116 is arranged to process user data between head 108 and a central processing unit. Processor 116 responds to commands from the central processing unit to operate actuator motor 110 to move head 108 to a selected destination track, and processes servo data recovered from a track to operate actuator motor 110 to maintain the position of head 108 adjacent the selected track.

Figure 2:
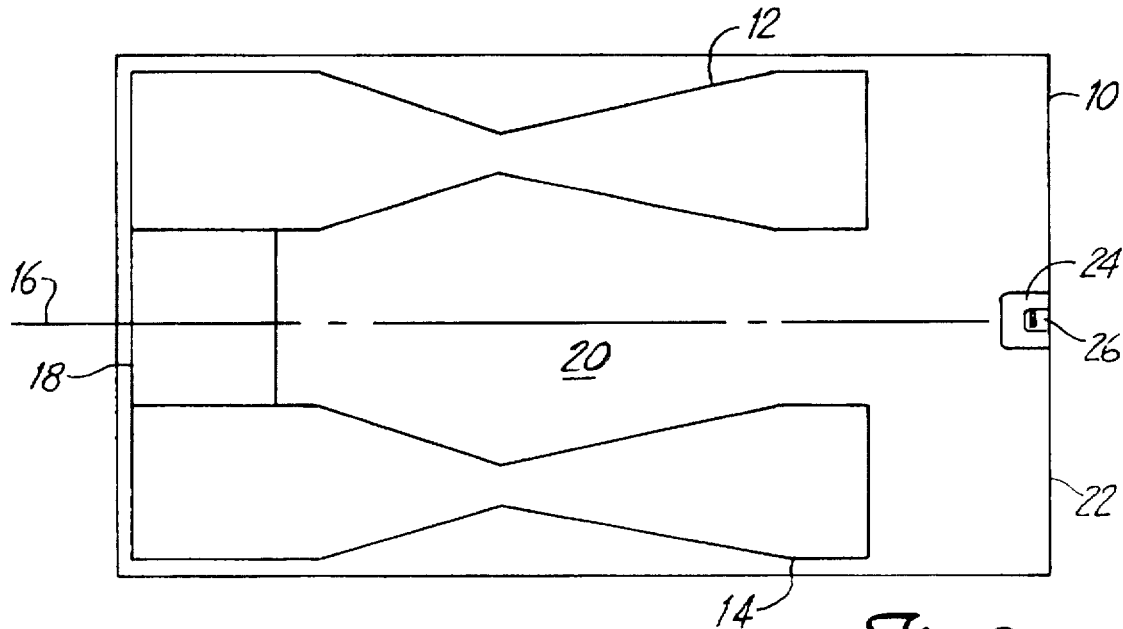
FIG. 2 is a plan view from the air-bearing surface, of a typical slider having a central transducer at a trailing edge.
Figure 3:
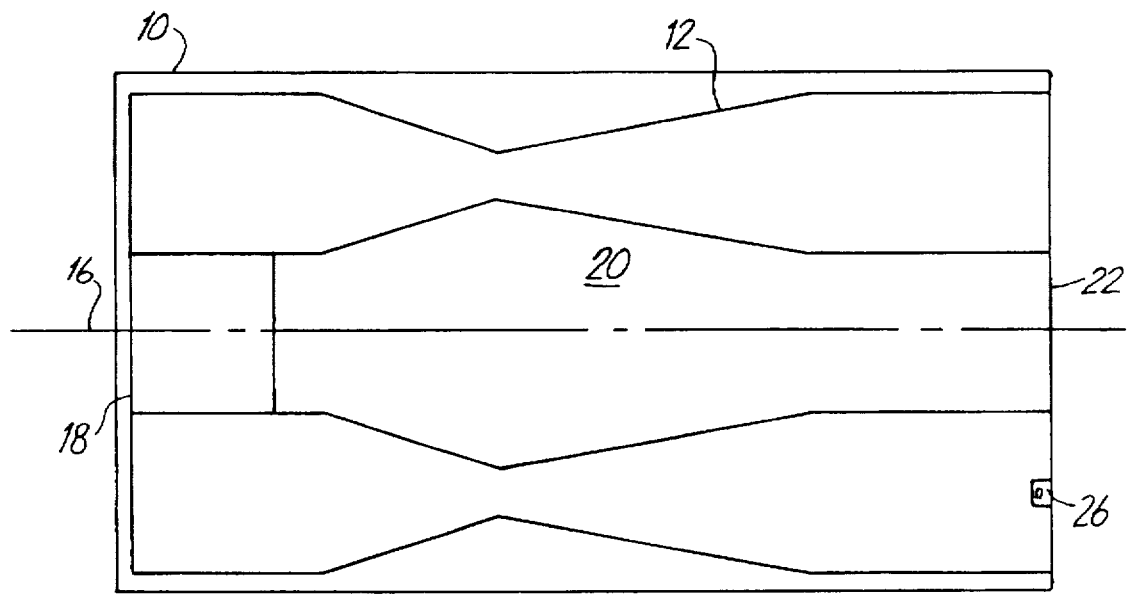
FIG. 3 is a plan view from the air-bearing surface, of a typical slider having a transducer at a trailing edge of a rail.

FIGS. 2 and 3 illustrate a slider 10 from the perspective of a disc confronting the slider. Typically, slider 10 includes a pair of rails 12 and 14 arranged in parallel relation longitudinally along the length of the slider and symmetrical around centerline 16. Slider 10 may be constructed of alumina or other suitable material and rails 12 and 14 may be integrally formed of the same material as slider 10 and raised from the central portion of the slider by a predetermined amount. A crossrail 18 may optionally be provided at a forward end of the slider between rails 12 and 14. A pressure cavity 20 is formed between rails 12 and 14, the exact nature of the pressure cavity being dictated by the size and shape of rails 12 and 14 and of crossrail 18, if any. Cavity 20 may be a negative pressure cavity, an ambient pressure cavity, or even positive pressure cavity, depending upon the precise configuration of the rails 12 and 14 and crossrail 18 (if any). Thus, the slider may be a negative pressure slider, in which case crossrail 18 is included, or may be a catamaran type slider, in which case crossrail 18 is absent. Additionally, while rails 12 and 14 are shown having their trailing edges short of the trailing edge 22 of the slider, rails 12 and 14 may extend to trailing edge 22. In the embodiment illustrated in FIG. 2, an island 24 extends from the surface of body 10 to a height approximately equal to that of air-bearing surfaces 12 and 14. As will be shown in greater detail below, island 24 includes a transducer recess 26 at the trailing edge 22 in which the transducer (not shown in FIG. 2) is located.

In the embodiment illustrated in FIG. 3, the rails 12 and 14 extend to the trailing edge 22 of the slider and instead of employing an island 24 as in FIG. 2, the transducer (not shown in FIG. 3) is positioned within a recess 26 at the trailing edge of one or both of rails 12 and 14.

Figure 4:
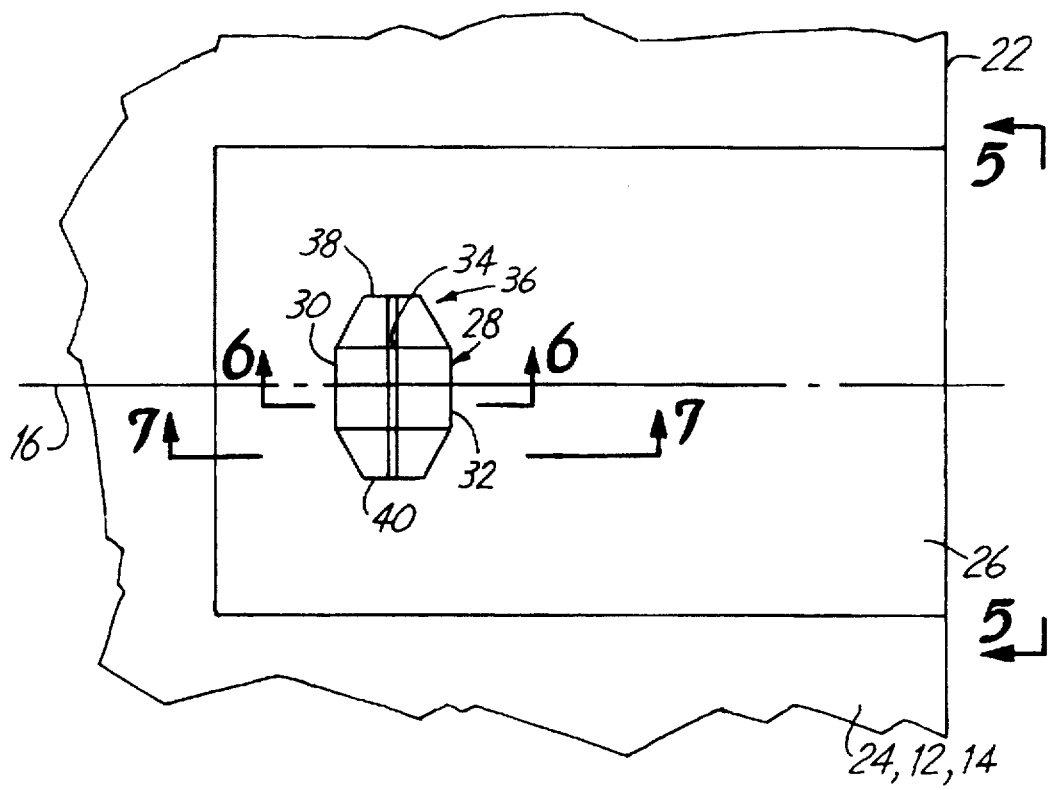
FIG. 4 is an enlarged plan view illustrating the transducer region of the slider of either FIG. 2 or 3.
Figure 5:
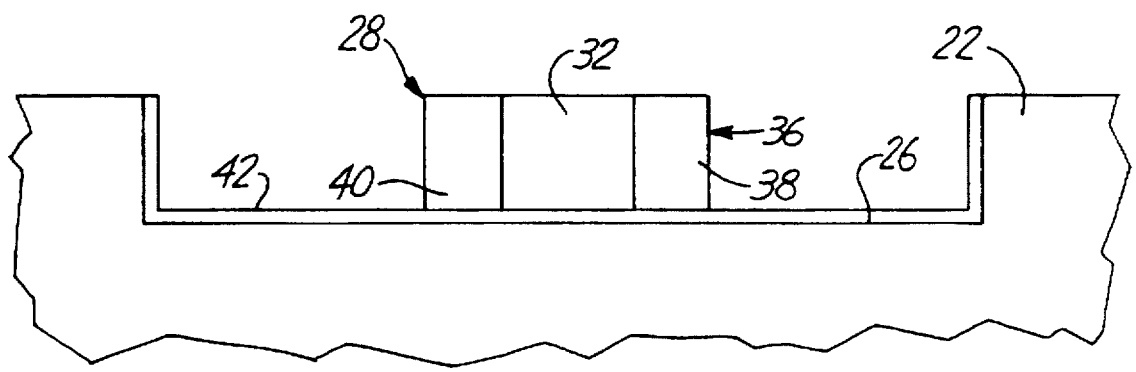
FIG. 5 is an end view of the transducer region taken at line 5—5 in FIG. 4, but illustrating the barrier layer according to the present invention.
Figure 6:
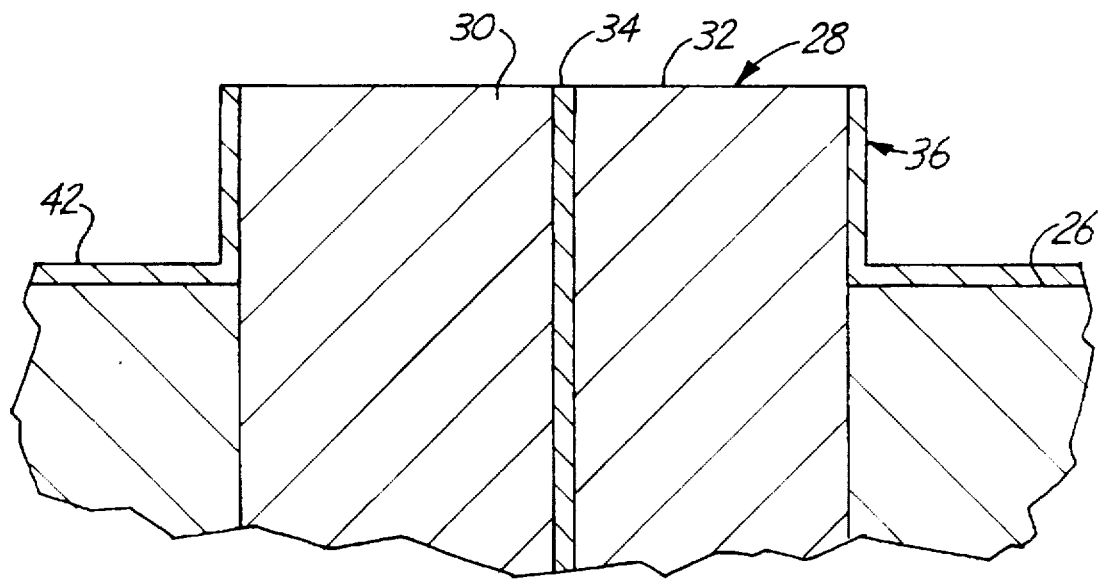
FIGS. 6 and 7 are section views of the transducer region taken at lines 6—6 and 7—7, respectively in FIG. 4, but illustrating the barrier layer according to the present invention.
Figure 7:
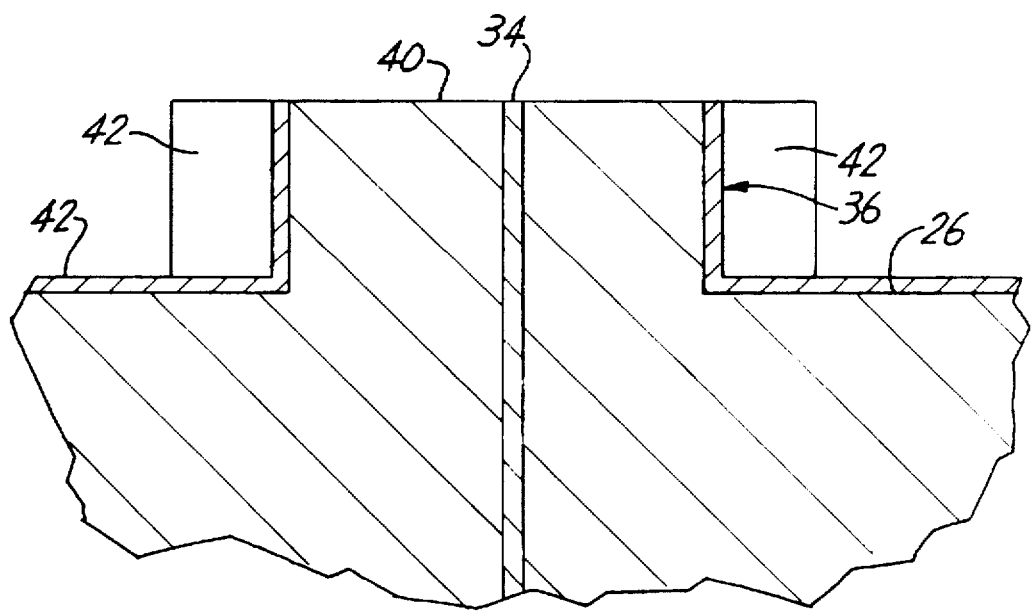

FIG. 4 is a plan view, as in FIGS. 2 and 3, and FIG. 5 is a view from the trailing end of slider 10, illustrating recess 26 and a transducer 28 therein. FIGS. 6 and 7 are section views taken at lines 6—6 and 7—7, respectively in FIG. 4. Transducer 28 includes a pair of thin film magnetic layers 30 and 32, the air-bearing surfaces of which are shown in FIG. 4, separated by a gap 34 constructed of a suitable insulating material such as aluminum oxide ($Al_2O_3$) or silicon oxide ($SiO_2$). The thin film layers 30, 32, and 34 forming transducer 28 are deposited directly onto the alumina forming slider body 10. Recess 26 is etched into the slider body or rail as the case may be leaving a diamond-shaped transducer protrusion 36 (FIG. 4). Protrusion 36 includes the portions of magnetic layers 30 and 32 forming the pole tips of the transducer, the portions of gap 34 forming the transducing gap, and portions of the alumina of the slider shown in FIG. 3 as forming wings 38 and 40 on each side of the transducer.

As shown particularly in FIGS. 5–7, a thin layer 42 of the present invention is applied to the lower surface and side walls of recess 26 and to the side walls of protrusion 36.

More particularly, layer 42 is formed of a barrier material, such as an oleophobic and hydrophobic fluorochemical acrylate polymer, which has a surface energy lower than the surface energy of the alumina slider and lower than the surface tension of the lubricant and outgassed liquid, thereby effectively reducing the surface energy of the slider in the region of the recess. Liquids, silicones and debris are repelled from recess 26 due to the low surface energy of recess 26. One suitable polymer is commercially available from Nye Lubricants, Inc. of New Bedford, Massachusetts under the brand name "Nyebar". Barrier film 42 minimizes the build-up of liquid within recess 26, thereby insuring proper flying height for the transducer.

Layer 42 is applied by dipping the slider into a solution of liquid barrier material to apply a thin coat of barrier material to the slider, and curing the barrier material coat to form a bonded layer having a thickness between about 10–12Å. A solvent dip is used to remove excess barrier polymer, and the slider is then be degreased in a well-known manner using vaporized solvent. Curing is accomplished by air or oven drying. It is preferred that any polymer barrier material be removed from the air-bearing surface of the slider and from the confronting gap or active region (as the case may be) of the head. The barrier polymer may be applied by any suitable technique, such as spin coating, spraying, sputter depositing and photolithograph processes. In the case of deposition application of the barrier polymer, it is preferred to mask off the air-bearing surfaces to prevent deposition of polymer thereon. The polymer layer may be cured by any well known technique, including baking, radiation curing and electron beam curing. In any case, the polymer forming the barrier layer forms a strong bond to the recess 26 of the slider. While the preferred barrier layer has a thickness of about 10–12Å, the thickness of the barrier layer will depend on the specific techniques for application, cleaning and curing the barrier polymer, which in turn may be based on recommendations of the manufacturer of the polymer. The specific techniques may result in barrier layers with thicknesses between about 5 and 100Å.

Figure 8:
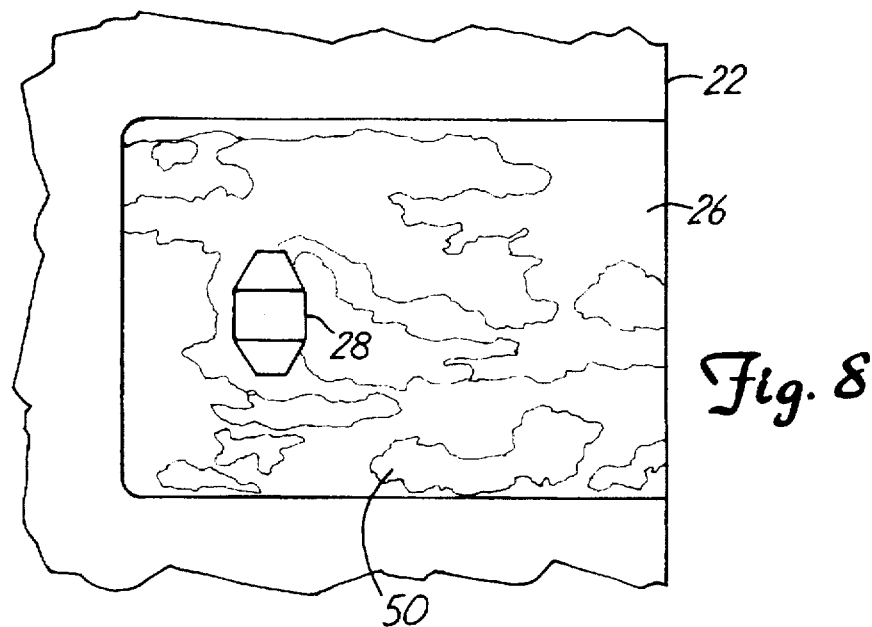
FIGS. 8 and 9 are plan views of the transducer region of sliders illustrating the effects of the barrier layer according to the present invention.
Figure 9:
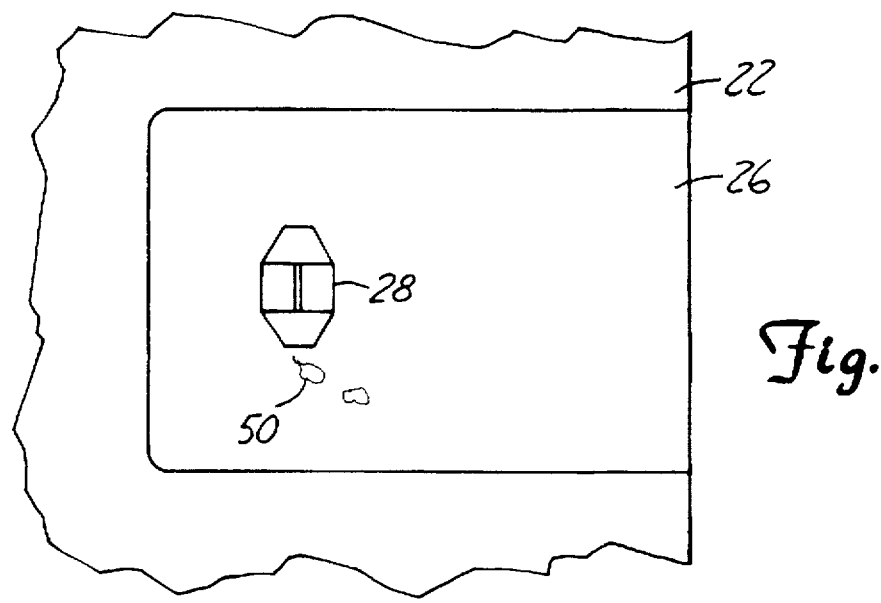

FIGS. 8 and 9 illustrate the recessed portion 26 and transducer 28 of two sliders similarly constructed sliders that were each subjected to 40,000 contact start-stop cycles between the slider and a magnetic disc medium. The slider shown in FIG. 8 does not contain a barrier layer 42 in accordance with the present invention. As can be viewed in the FIG. 8, debris 50 has accumulated after 40,000 start-stop cycles along the forward (upstream) edge of recess 26 and on the bottom surface of recess 26 on each side and to the trailing portion of the recess behind the transducer protrusion. The slider shown in FIG. 9 contains a barrier layer 42 in recess 26 in accordance with the present invention. As can be viewed in FIG. 9, very little debris 50 has accumulated within the recess, or along the surfaces of the transducer protrusion.

The present invention thus provides an effective barrier to the accumulation of liquid and debris in the recess of a patterned pole transducer on a slider.

Although the present invention has been described with reference to preferred embodiments, workers skilled in the art will recognize that changes may be made in form and detail without departing from the spirit and scope of the invention.

What is claimed is:

1. A slider for use with a lubricated disc in a magnetic disc drive, the slider including a recess at a trailing edge of the slider and a thin film inductive magnetic transducer protruding from a lower surface of the recess, the transducer having patterned magnetic poles, the improvement comprising a barrier layer bonded to the lower surface of the recess, the barrier layer being constructed of an oleophobic, hydrophobic polymer having a surface energy lower than a surface tension of the lubricant.

2. The slider of claim 1 wherein the polymer is a fluorochemical acrylate.

3. The slider of claim 1 wherein the slider is formed of a material having a surface energy greater than the surface tension of the lubricant.

4. The slider of claim 3 wherein the polymer is a fluorochemical acrylate.

5. A magnetic disc drive having a disc having a surface lubricated with a lubricant, the lubricant having a surface tension, an actuator arm having a slider for flying a transducer adjacent the disc surface, the slider comprising:

a body having a surface;

at least two rails protruding from the body surface, the rails forming air bearing surfaces substantially parallel to the body surface;

a pressure cavity formed by the body surface between the rails;

a recess at a trailing edge of the body, the recess having a lower surface substantially parallel to the air bearing surfaces;

a thin film inductive patterned pole magnetic transducer protruding from the lower surface of the recess toward the air bearing surface; and a barrier layer bonded to the lower surface of the recess, the barrier layer being constructed of an oleophobic and hydrophobic polymer having a surface energy lower than the surface tension of the lubricant.

6. The slider of claim 5 wherein the polymer is a fluorochemical acrylate.

7. The slider of claim 5 including an island protruding from the body between the rails at the trailing edge of the body, the recess being formed in the island.

8. The slider of claim 7 wherein the polymer is a fluorochemical acrylate.

9. The slider of claim 5 wherein the recess is formed in at least one of the rails.

10. The slider of claim 9 wherein the polymer is a fluorochemical acrylate.

11. The slider of claim 5 wherein the body is formed of a material having a surface energy greater than the surface tension of the lubricant.

12. The slider of claim 11 including an island protruding from the body between the rails at the trailing edge of the body, the recess being formed in the island.

13. The slider of claim 12 wherein the polymer is a fluorochemical acrylate.

14. The slider of claim 11 wherein the recess is formed in at least one of the rails.

15. The slider of claim 14 wherein the polymer is a fluorochemical acrylate.

* * * * *